US010255291B1

(12) United States Patent
Natanzon et al.

(10) Patent No.: US 10,255,291 B1
(45) Date of Patent: Apr. 9, 2019

(54) REPLICATION OF VOLUMES USING PARTIAL VOLUME SPLIT (75) Inventors: Assaf Natanzon, Ramat-Gan (IL); Yuval Aharoni, Kfar-Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 440 days.

(21) Appl. No.: 12/493,293

(22) Filed: Jun. 29, 2009

(51) Int. Cl.
*G06F 17/30* (2006.01)
*G06F 3/06* (2006.01)
*G06F 15/16* (2006.01)

(52) U.S. Cl.
CPC ........ *G06F 17/30215* (2013.01); *G06F 3/067* (2013.01); *G06F 17/30584* (2013.01)

(58) Field of Classification Search
CPC ......... G06F 17/30215; G06F 17/30584; G06F 3/067
USPC ......................... 707/639, 649, 656; 714/6.23
See application file for complete search history.

(56) References Cited

U.S. PATENT DOCUMENTS

| | | | | |
|---|---|---|---|---|
| 5,740,397 A * | 4/1998 | Levy | .................. | G06F 3/065 714/6.23 |
| 6,389,459 B1 * | 5/2002 | McDowell | .......... | G06F 11/2069 714/6.23 |
| 6,691,245 B1 * | 2/2004 | Dekoning | .................. | 714/6.31 |
| 6,871,238 B1 * | 3/2005 | Young | .................. | 707/202 |
| 7,017,076 B2 * | 3/2006 | Ohno et al. | .................. | 714/15 |
| 7,467,329 B1 * | 12/2008 | Keeton | .................. | G06F 11/008 714/15 |
| 7,779,295 B1 * | 8/2010 | Shah | .................. | G06F 11/1458 714/6.32 |
| 7,885,923 B1 * | 2/2011 | Tawri et al. | .................. | 707/610 |
| 7,925,630 B1 * | 4/2011 | Krishnamurthy | .......... | G06F 17/30088 707/640 |
| 2003/0004972 A1 * | 1/2003 | Winokur | .......... | G06F 17/30067 707/999.2 |
| 2003/0182313 A1 * | 9/2003 | Federwisch et al. | .......... | 707/200 |
| 2003/0217119 A1 * | 11/2003 | Raman | .................. | H04L 67/1095 714/6.12 |
| 2007/0038656 A1 * | 2/2007 | Black | .................. | G06F 3/0689 707/999.1 |
| 2010/0042791 A1 * | 2/2010 | Heiman | .................. | G06F 11/1435 711/162 |

(Continued)

OTHER PUBLICATIONS

Kai Hwang and Faye A. Briggs. Computer Architecture and Parallel Processing. McGraw-Hill, New York, 1984, Title Pages and Subsection 2.1.3, pp. 58-60.*

*Primary Examiner* — Usmaan Saeed
*Assistant Examiner* — Brian E. Weinrich
(74) *Attorney, Agent, or Firm* — Krishnendu Gupta; David Kuznick (57) ABSTRACT

A method and system comprising splitting an IO in a system; intercepting the IO in an appliance; determining whether the IO is directed to a replicated file system; sending the IO directed to the replicated file system to a replication device; and acknowledging the receipt of the IO. A method, system and computer program product comprising requesting access to a point in time in a replicated file system; determining from a plurality of bookmarks of file system configurations; a bookmark corresponding to the point in time; determining if the current configuration of the file system is equivalent to the bookmark; and reconfiguring the file system when the current configuration is not equivalent to the configuration of the bookmark.

20 Claims, 7 Drawing Sheets

(56) References Cited

U.S. PATENT DOCUMENTS

2010/0280996 A1* 11/2010 Gross et al. ................ 707/649

* cited by examiner

REPLICATION OF VOLUMES USING PARTIAL VOLUME SPLIT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to representing and assessing compliance of information topologies.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production to site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method and system comprising splitting an IO in a system, intercepting the IO in an appliance, determining whether the IO is directed to a replicated file system, sending the IO directed to the replicated file system to a replication device, and acknowledging the receipt of the IO.

DESCRIPTION OF DRAWINGS

The above and further advantages of the present invention may be better under stood by referring to the following description taken into conjunction with the accompanying drawings in which.

DETAILED DESCRIPTION

Techniques of the current invention may configure a data storage system, to enable replication of and access to the actual mapping of a file system stored on that data storage system. For example, in a data storage system with multiple volumes, the current techniques allow replication of the file system, where that file system may be striped across multiple volumes in the data storage system. The current techniques also enable the data storage system to be configured, for example by configuring a storage splitter or intelligent fabric splitter, to expose a virtual volume including only portions of one or more volumes which are relevant to the one file system. As well, the current techniques also allow for replication of file system where that file system's configuration, such as the amount of space allocated to that file system, is dynamically changing. In this way, the current techniques enable replication of a single file system, with a dynamic configuration striped across multiple volumes, as if it resides on a single LUN.

The current techniques may be practiced on any type of data storage system, however the current techniques may be particularly useful on the Celerra data storage system as produced by EMC Corporation of Hopkinton, Mass. With respect to Celerra and storage systems in general, the following definitions may be particularly useful. A disk may be a physical disk within the storage system. A logical unit may be a logical entry provided by a storage system for accessing data from the storage system. An image may be a copy of a logical storage unit at a specific point in time. A meta volume may be a volume which may be a concatenation of volumes of several types, which may be extended by adding more volumes. A stripe may be a volume created by striping several volumes together. If the volumes in the stripe are not the same size, striping may be done according to the smallest volume, which may cause loss of space. A slice may be a portion of a volume or a stripe. As well, each slice of the volume may have a mapping on the location of the volume where it starts and ends; a slice may be sliced again.

A slice may be a volume which is a consecutive part of another volume. For instance, a slice may be taken out of a meta volume starting at location x and ending at location y. Slices, Stripes and Meta volumes may be from internal volumes and may be recursively defined; i.e. meta volumes may be concatenation of Meta volumes, slices, stripes and disks. As well, a slice may be a slice of a slice, disk, meta or stripe. As well, a stripe may be striped over stripes, meta volumes and slices.

Figure 2:
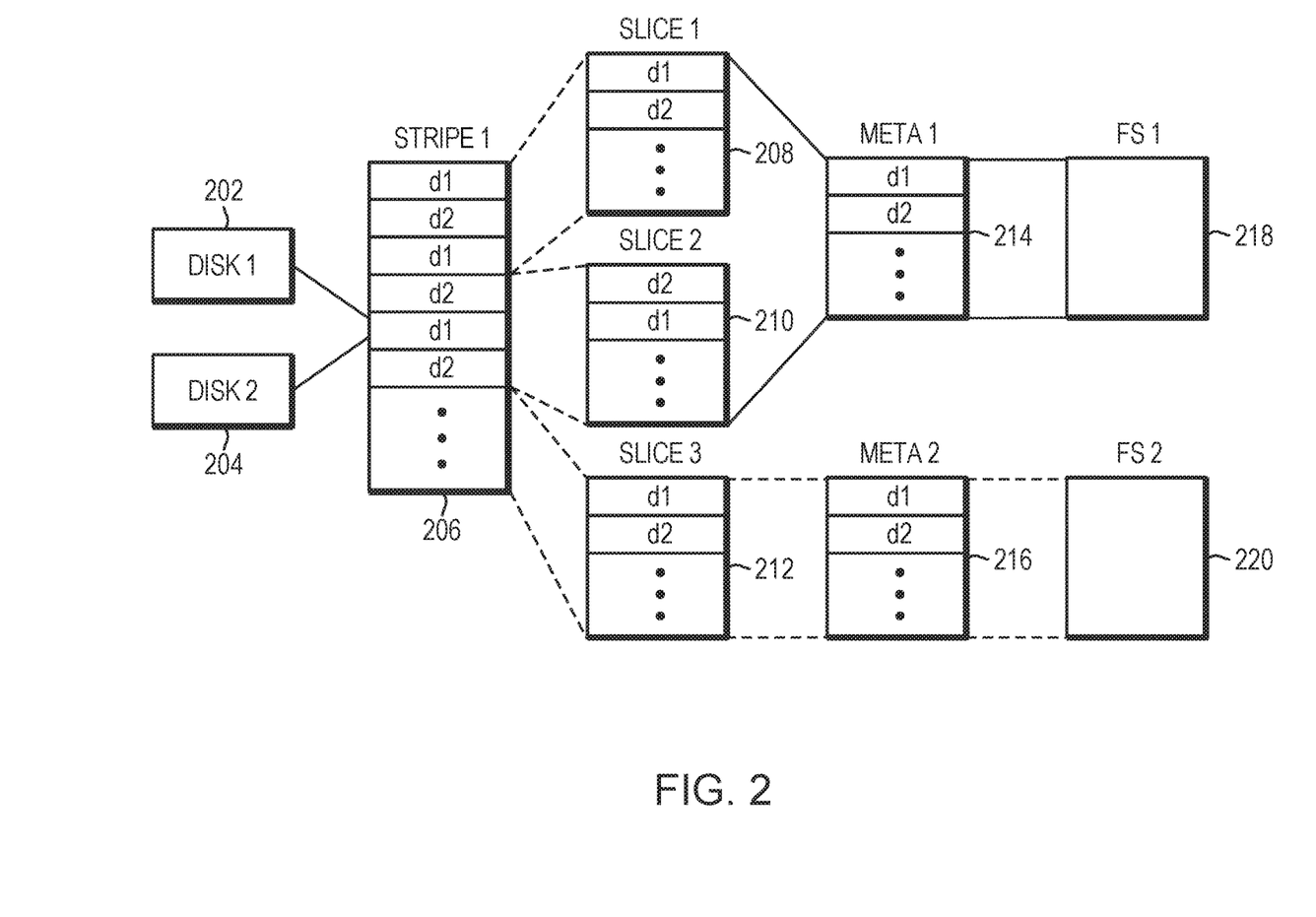
FIG. 2 is an embodiment of a file system that can be part of the system of FIG. 1.

For example, refer to the embodiment of FIG. 2. In FIG. 2, disk 1 202 and disk 2 204 are shown. Stripe 1 206 corresponds to pieces or slices of both disk 1 202 and disk 2 204 as illustrated by the slices d1 and d2 on stripe 206. Further, each slice of stripe 1 may further be divided into slices such as slice 1 208, slice 2 210, and slice 3 212. These slices may be contained on meta 1 214 or meta 2 216. As well FS 1 218 and FS2 220 may be located on meta 1 214 and meta 2 216, respectively.

As well, a storage pool may be a collection of disks and volumes. Storage pools may be extended by adding more volumes to the storage pool. Automatic volume management (AVM) is a feature that may manage a file system (FS). In particular, when a file system is nearing its capacity, AVM may expand the capacity of that file system allocating more storage space for the File system. For example, for a FS using AVM there may be a threshold configured (i.e. 90%). When the FS uses more then threshold, the file system may be extended using a new slice from the storage pool the file system uses. In some cases, the file system would be increased by 10% or least 1 GB. AVM works only for pool based file systems, but also meta based file systems may be extended manually. On a meta volume, the striping may correspond to many different physical volumes may create a complex mapping of the file system.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

File System Background

A file system may be a system for organizing data on a storage device. File systems may be created on many different types of meta drives. A FS may also be created in a storage pool. For example, a Celerra file system may be configured from a meta volume. If the file system is taken from a pool, the pool may automatically allocate the meta volume from the file system and may create another meta volume containing new slices of data when the file system is extended. In general, a file system created within a storage pool may support volume slicing, which means the file system may reside on portions of disks. If slicing is not supported, then increasing a file system size may use a full disk and not the size requested. As well, a file system using a storage pool may be configured to use AVM, which may dynamically change the size allocated to the file system. A file system may also be created on a meta volume.

Given such complex mapping of a file system, replicating a file system may present complex problems. For example, in order to enable replication, the data written to the file system must be captured and replicated. If there are multiple files systems or data flowing through a system, it may be necessary to determine what data pertains to the file system to be replicated. As well, if the size and configuration of the file system is constantly changing, then the size and configuration of the replicated file system may also change. The ability to change the size and configuration of a replicated file system presents numerous complexities.

Additionally, rolling back a file system from one size or configuration to another adds additional challenges to this type of replication. The techniques presented enable replication of a particular file system, in isolation or when it is one of many file systems in a particular system. As well, the techniques enable replication when the file system is striped across different volumes and media. Further, the current techniques also enable the replication when the size and configuration of the file system is changing.

Capturing the Data:

As noted above, part of the replication of the file system may be capturing the IO that is to be written to that file system. As a FS may be striped or located on multiple disks, IO for a file system need to be captured from multiple disks. As well, if there are multiple file systems striped across multiple disks, a determination must be made as to what IO pertains to the replicated file system.

For example, take the EMC Celerra, which is a Network Area Storage (NAS) gateway solution. NAS gateway solutions, such as Celerra, often include data mover which exposes file systems over NFS and CIFS, handle the protocols, and the file systems data, which is usually kept on an external array. For example EMC external storage arrays, either CLARiiON arrays or Symmetrix array may be used to keep the data. In order to replicate the file system kept on such an array, a splitter driver may be used to "split" the IO data to a replication or recovery appliance.

The splitter driver may capture all the IOs that are written to the physical volumes on which the file system reside on and transfer these IOs to the recovery appliance. A recovery appliance could be, for example, EMC's Recover Point appliance. In an embodiment with EMC CLARiiON storage arrays, the Recover Point CLARiiON splitter, may be used to split the data. The CLARiiON splitter driver may run on the CLARiiON array and may serve as a data tap for every replicated CLARiiON. IOs that reach replicated volumes may be written first to the recover point appliance and only after the appliance acknowledges the IO, may the IO be written to the storage.

Figure 1:
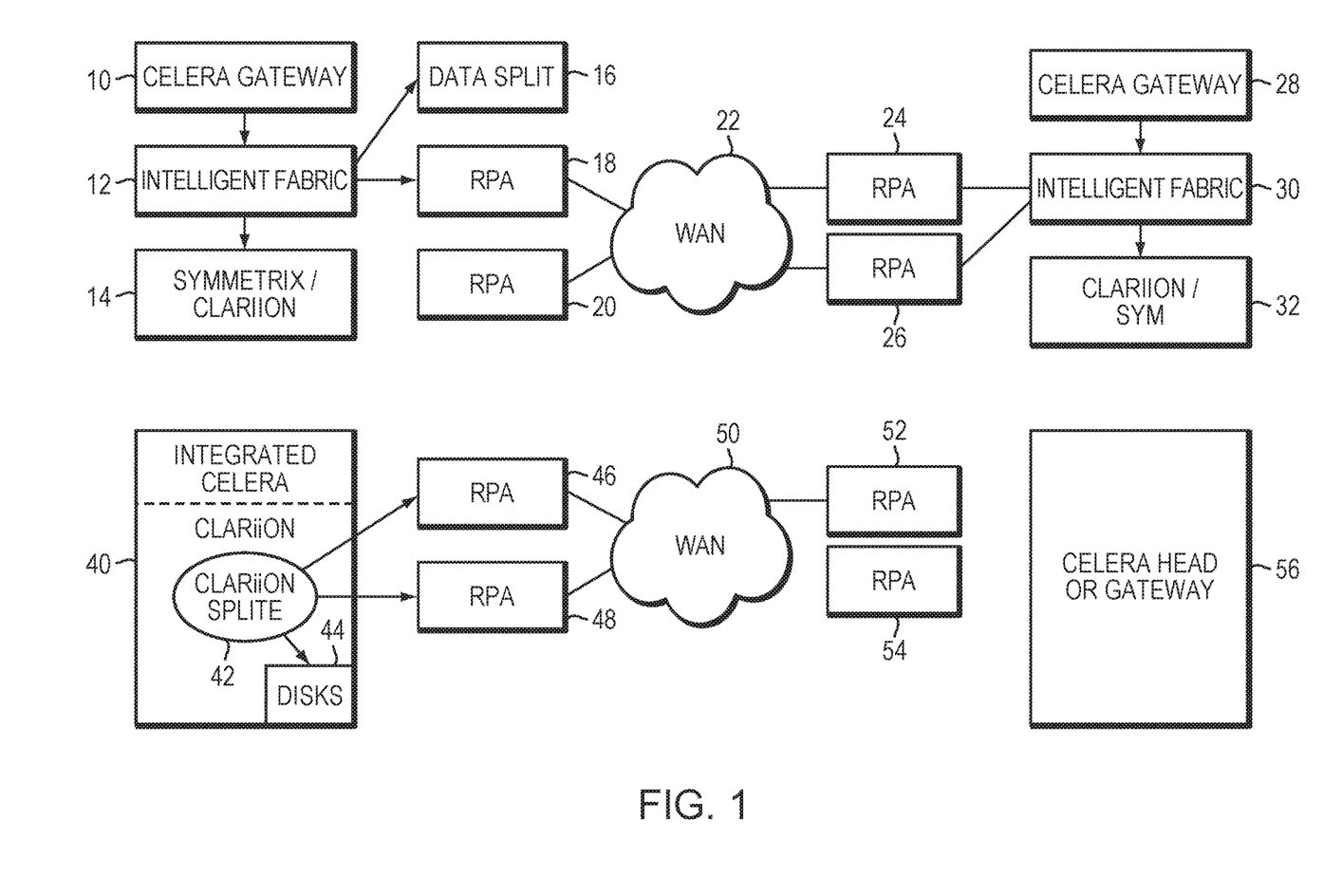
FIG. 1 is a data storage environment including an embodiment of a system in which the embodiments of the method may operate.

Refer to the embodiment of FIG. 1, using the CLARiiON splitter. In this embodiment the Celera and CLARiiON 40 are integrated. This device includes both disks 44 and a CLARiiON splitter 42. The CLARiiON splitter may split the IO to a replication device 46 and to the CLARiiON disks. The replication appliances 46 and 48, such as the recovery point application, may also be connected to a WAN 50. The WAN 50, in turn, may also be connected to other Recovery point appliances 52 and 54, which are in turn connected to a Celera head or gateway 56.

In an embodiment with Symmetrix arrays, an intelligent fabric driver could be used as the splitter. Some types of intelligent fabric drivers are available from Cisco are: SSM and MSM-4/18 supported by the following switches 9216, 9222i, 9506, 9509, 9513, and some from Brocade are: Sabre-Brocade 7600 Scimitar-Brocade FA4-18 blade. The intelligent fabric splitters are splitters that run at the network level inside fiber channel switches. Using the intelligent fabric or CLARiiON splitter, all IOs sent to a specific "Disk" may be captured by replication appliances, such as Recovery Point. In this way data may be replicated.

An example embodiment of the intelligent fabric use of the splitter may be been in FIG. 1. In FIG. 1 the Celerra Gateway 10 is connected to an intelligent fabric 12. The intelligent fabric may serve as a data splitter 16, which splits the data to a replication appliance such as the recovery point appliance 18. As well, the intelligent fabric 12 is also connected to either data a storage array, such as the embodiments pictured of the Symmetrix or CLARiiON.

Single File System Level Replication Using Sub Disk Replication:

Some file systems, such as a Celera file system, may be defined over a Meta volume. A meta volume is a logical entity which may reside on one or more physical disks. A replication solution which replicates this type of file system may do one of the following:

1. Replicate whole disks: in this case the file systems on the production and replica site may be configured identically so that the logical structure over the physical disks may be consistent
2. Replicate portions of disks, for instance a two file systems may be striped over 2 disks, so that each file system uses blocks of the 2 disks.

In the replicating in case 1, the configuration on the local site may be read and applied on the replica site; however, the layout of the file systems may not be part of the replicated volumes and the system may have to create it on the replica site.

With respect the second case, it may be necessary to read the structure of the logical volumes and the file system to determine a mapping function denoting where each file system may be stored on physical volumes via the metas/stripes, and slices. For example in an embodiment, using the Celerra CLI, or MPFS abilities, Recover Point may read the structure of the Celerra logical volumes and file systems, i.e. which metas/stripes/slices are carved from each physical volume. Using the mapping Recover Point may create a translation function. The user may select which file systems to replicate, all the physical disk which the replicated files systems use may be splitted to the recover point appliance.

Then for each IO the following process may be used. When the IO arrives at replication appliance (e.g. physical disk address), the replication appliance may translate the IO to its logical address, i.e. to which volume the IO should be written. The recovery appliance may check if the logical volume is a part of a replicated file system. If the IO is not to be written to the replicated file system, the IO may be acknowledged to the storage, and the appliance may ignore it. The acknowledgement to the storage may allow the storage to write the IO. If the IO is an IO to a replicated file system, the IO may be sent to the consistency group which replicated the file system and acknowledged to the storage.

The consistency group replicating the file system may have the mapping of the file system as it exists on the replica site, the consistency group may translate the IO to its physical address on the replica site. In this embodiment, IOs to replicated file systems are replicated, while IOs which arrive to physical volumes split by the splitter driver but are not part of replicated file systems are ignored. This provides a simple splitting algorithm while enabling replication at a more complex logical level.

Figure 3:
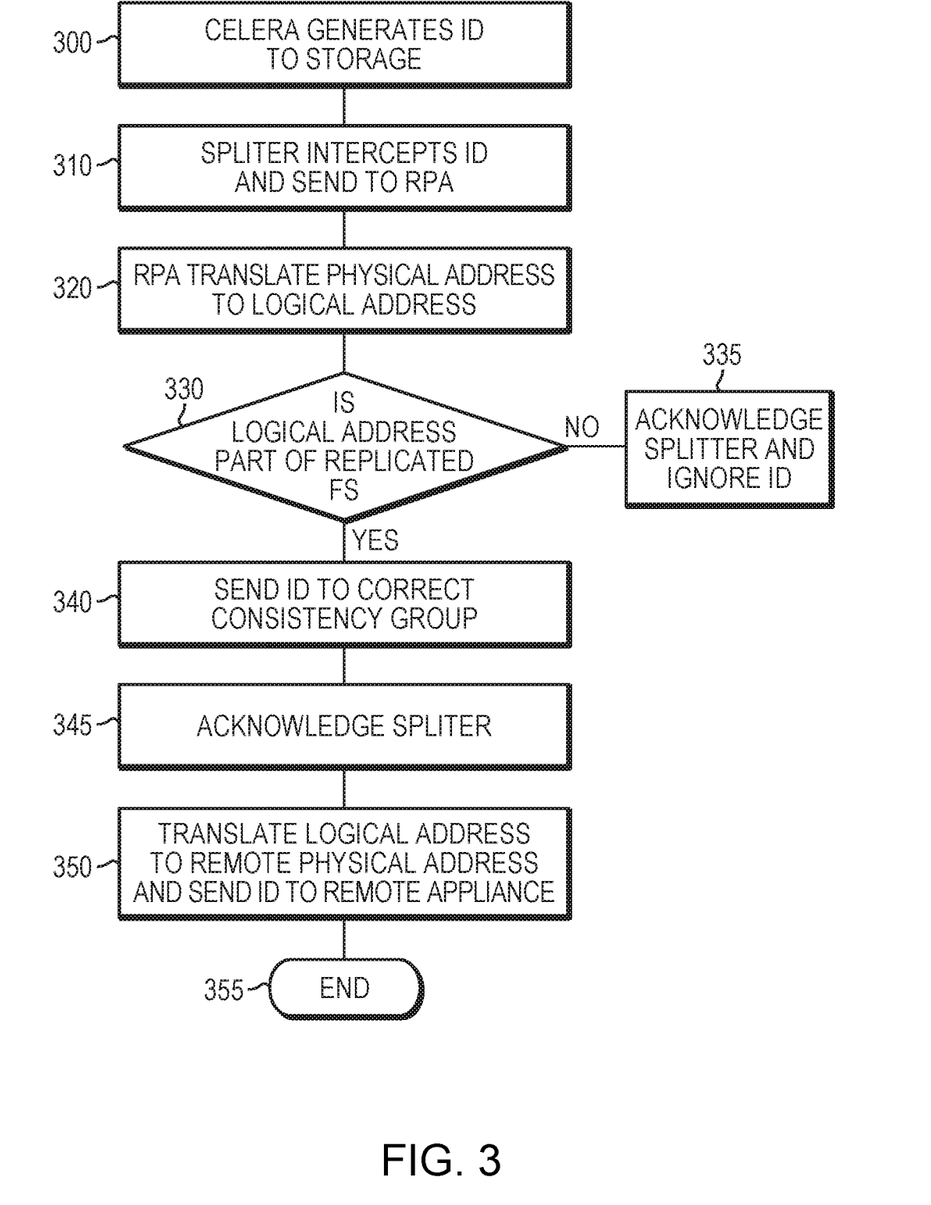
FIG. 3 is an embodiment of methods that can be applied to the system of FIG. 1.

For example, take the particular embodiment illustrated in FIG. 3. In FIG. 3, a Celera generates an IO to storage 300. The splitter intercepts the IO and sends it to a Recovery Point Appliance (RPA) 310. The RPA translates the physical address of the IO to a logical address of the IO 320. The RPA determines 330 if the logical address is part of the replicated file system. If it is not part of the file system, the IO is acknowledged and the IO is ignored 335. The IO is acknowledged so it may be written to the storage device. If the logical address is part of the replicated file system, then the IO is sent to select consistency group 340 and the IO is acknowledged to the splitter 345. The logical address is translated to the remote physical address and the IO is sent to the remote replication appliance 350.

Achieving Consistency

However, replicating only the meta disks on which file system reside may not enough to achieve consistent file system replication. For example, in the Celerra file system, which is a journal file system, where the journal does not reside within the file system itself. Rather, journals for all file systems are written to the same Log volume which is a special volume, (there is a log volume for each data mover). Therefore, in order to achieve consistency there is a need for bookmark points which do not need the log of the journal in order to recover. This may be accomplished by using a bookmark procedure.

For example, a Bookmark Procedure may pause file systems relevant to the consistency group (CG), in the embodiment using the Celerra this would call the pause command. A bookmark may then be taken on the CG. A bookmark may be a meta data point indicating a point in time is consistent. Then the file system may be resumed; in the embodiment of the Celerra system, the Celerra resume command is called. By pausing the file system and taking a book mark while the file system is in pause mode, the file system is not using the log, which allows the log to be consistent at the point in time. Replication applications, such as EMC's Recover Point, may allow the user to take bookmarks automatically at a given period of time as well as manually. This flexibility may allow the user to have an unlimited number of consistent bookmarks of the file system.

Figure 4:
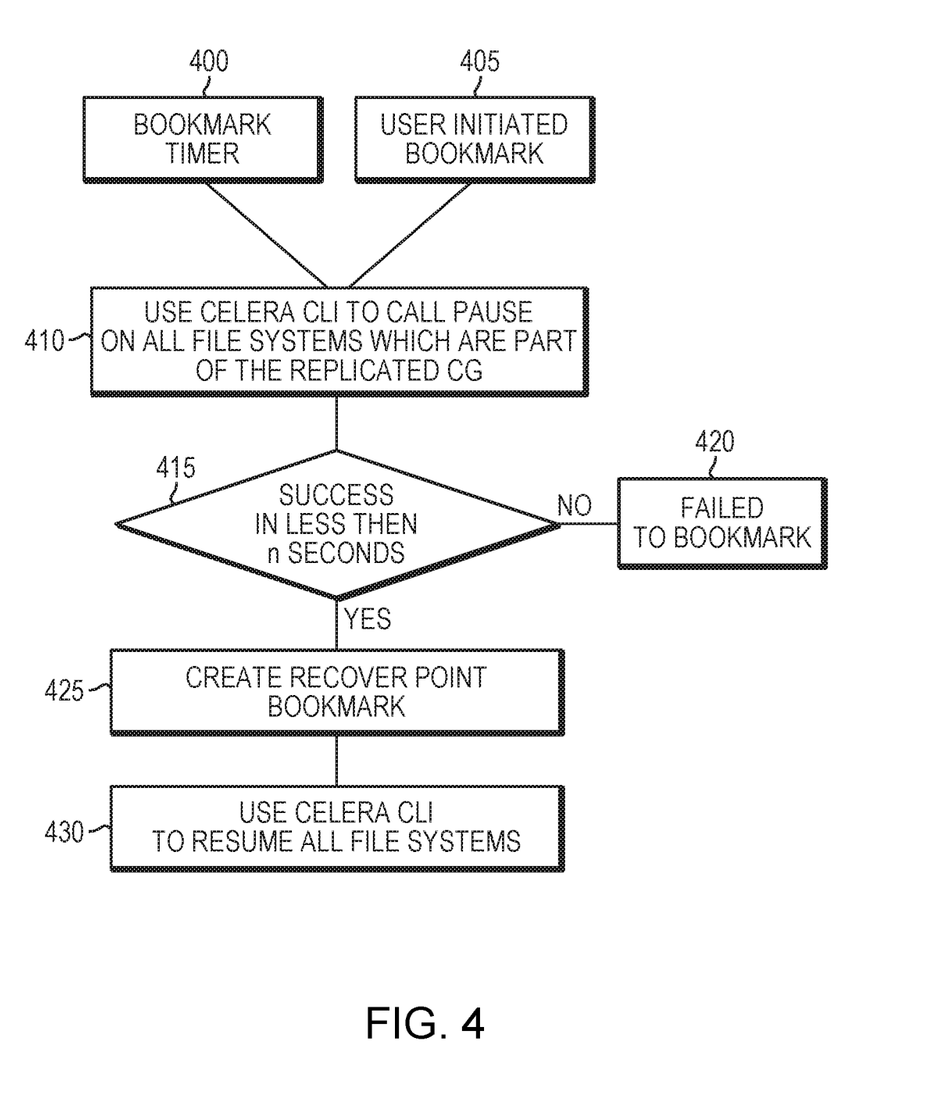
FIG. 4 is an embodiment of methods for creating a bookmark that can be applied to the system of FIG. 1.

For example, refer to the embodiment of FIG. 4. FIG. 4 illustrates an embodiment where there is both a bookmark timer 400 and a user initiated bookmark 405. Given a bookmark request, Celera may be used to pause the replicated file system 410. Success is determined if the system is paused within n seconds 415, in this case n=5 seconds. If the pause fails, then there is a failure to create a bookmark 420. If the pause succeeds, then a recover bookmark is created 425. Celerra is used to resume the replicated file system file system 430.

Handling Configuration Changes:

Additionally, some files systems, such as those that use AVM, may change configurations over time. As well, the configuration of a file system may be manually changed by a storage administrator. For example, the file system may decrease/increase in size, file systems may be deleted, and new file systems may be created. This means that the configuration of what is to be replicated is dynamic, not static. The Celerra system is one such example of a system with dynamic configuration. Therefore, a replication solution may not be complete unless it may handle configuration changes without user intervention.

In order to handle configuration changes, the current techniques may create an additional data stream, the file system configuration stream (maintained at the target replica journal volumes). The stream may contain file system and logical volume configuration, and may update every time the configuration changes. In some embodiments, a configuration change may be detected periodically based on a constant period of time. In other embodiments, the configuration may change in case of a special event, for instance if the replication appliance receives an IO which is written to a location which may not currently be mapped to a specific file system; which would cause the replication appliance to know a configuration change occurred and rescan the relevant system for the current configuration.

Figure 5:
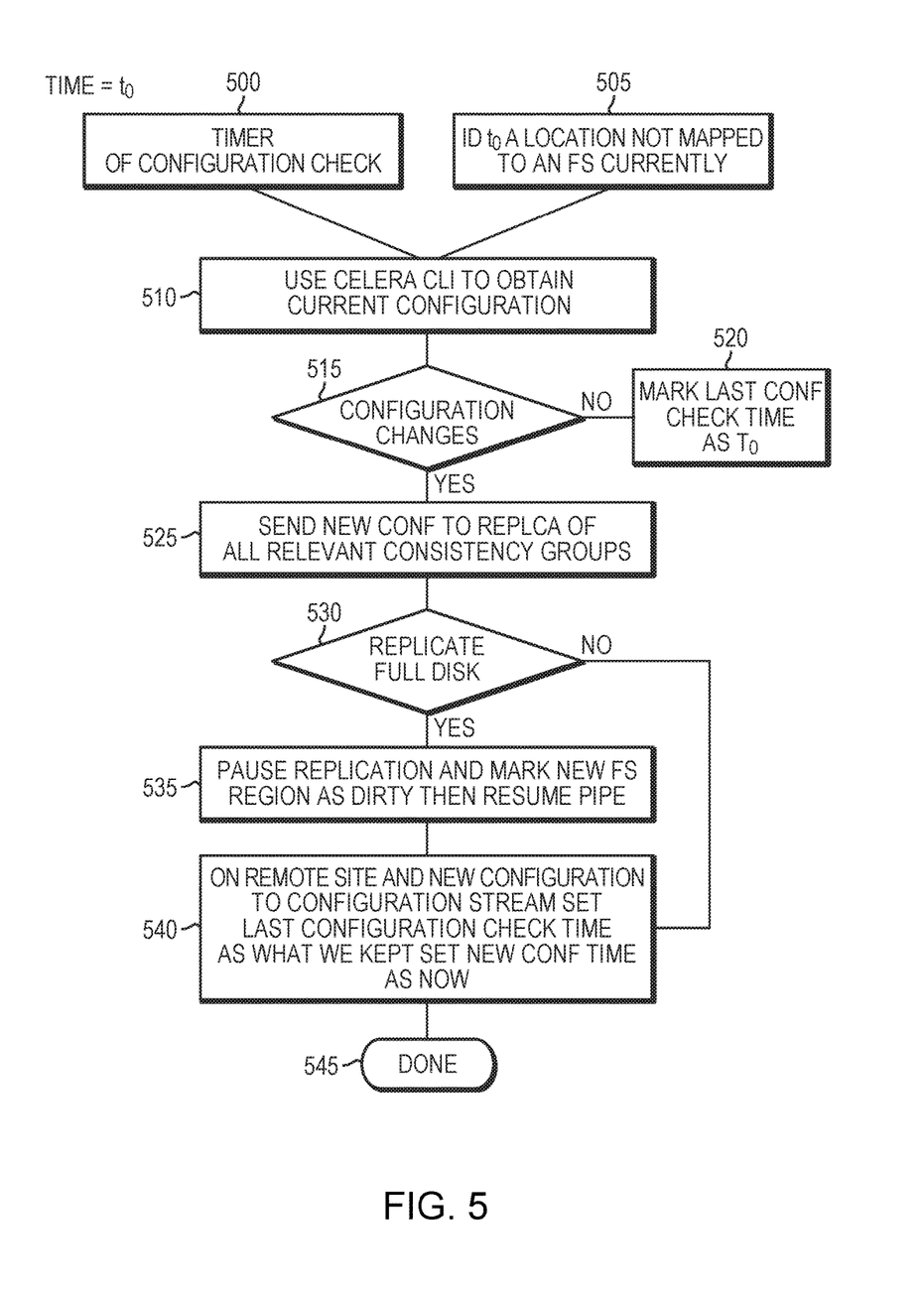
FIG. 5 is an embodiment of methods that can be applied to the system of FIG. 1.

For example, refer to the embodiment of FIG. 5. In this embodiment there are two methods to check the configuration changes, a timer 500 and when an IO is mapped to a location that is not consistent with the current configuration 505. Celera CLI may be used to obtain the current configuration of the replicated file system 510. It may be determined whether the configuration has changed 515. If the configuration has not changed, the configuration timer check may be reset to zero 520. If the configuration has changed, then the new configuration may be sent to the replication of all relevant consistency groups 525. If full disks is not replicated 530, the replication is paused and the new region is marked as dirty (e.g. to be replicated) than the replication is resumed 535. On the remote site the new configuration is added to the configuration stream 540. The time of the last configuration time check is set to the configuration time and the new configuration time is set to the current time. Periodically, the configuration may be checked. When a change is found, it may be assumed that the last configuration was valid at the last check time, and the new configuration is now valid.

When configuration change occurs the system may send the new configuration to the replica site, the appliance may keep the new configuration in the configuration stream, along, with each new configuration. As well, two timestamps may be kept, first the last timestamp for which the last configuration was valid, and secondly the time which the new configuration was detected. Snapshots which are relevant to point in time between the two timestamps may not be accessible as the system 540. When user accesses a snapshot, the replication appliance may create the relevant configuration of the file system and only then let the user access the image.

In other embodiments, the system may replicate only portions of volumes. In this embodiment, there may be portions of the file systems which have not been replicated to the replica site. If this were to occur, the replication may be paused for a few seconds, the new region of the volumes to be replicated may be marked as dirty and the replication may resume. In this embodiment, the case of the full physical disks being replicated, the replication does not need to be paused as all data may be replicated to the target site.

Figure 6:
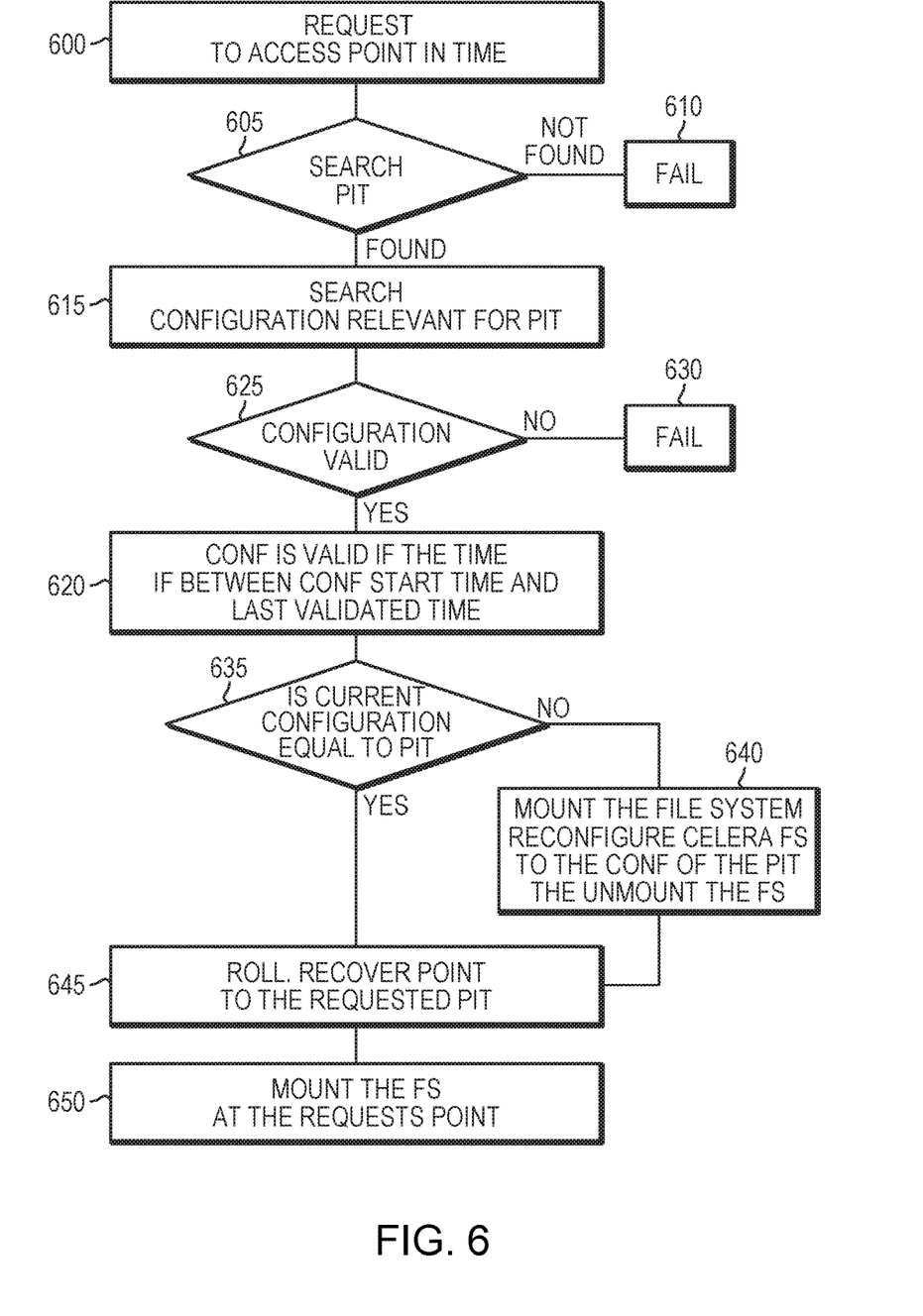
FIG. 6 is an embodiment of methods for requesting access to a point in time that can be applied to the system of FIG. 1.

For example refer to the embodiment illustrated in FIG. 6. Access to a particular point in time may be requested 600. The point in time bookmarks may be searched for an appropriate bookmark 605. If an appropriate point in time is not found, the request may fail 610. The configurations may also be searched for a relevant point in time 615. If the configuration is not valid, then the request may fail. If the request is valid, a determination may be made whether the current configuration is equal to the requested point in time 635. A configuration may be considered valid if the time of the bookmark is between the configuration start time and the last validation time 620.

Figure 7:
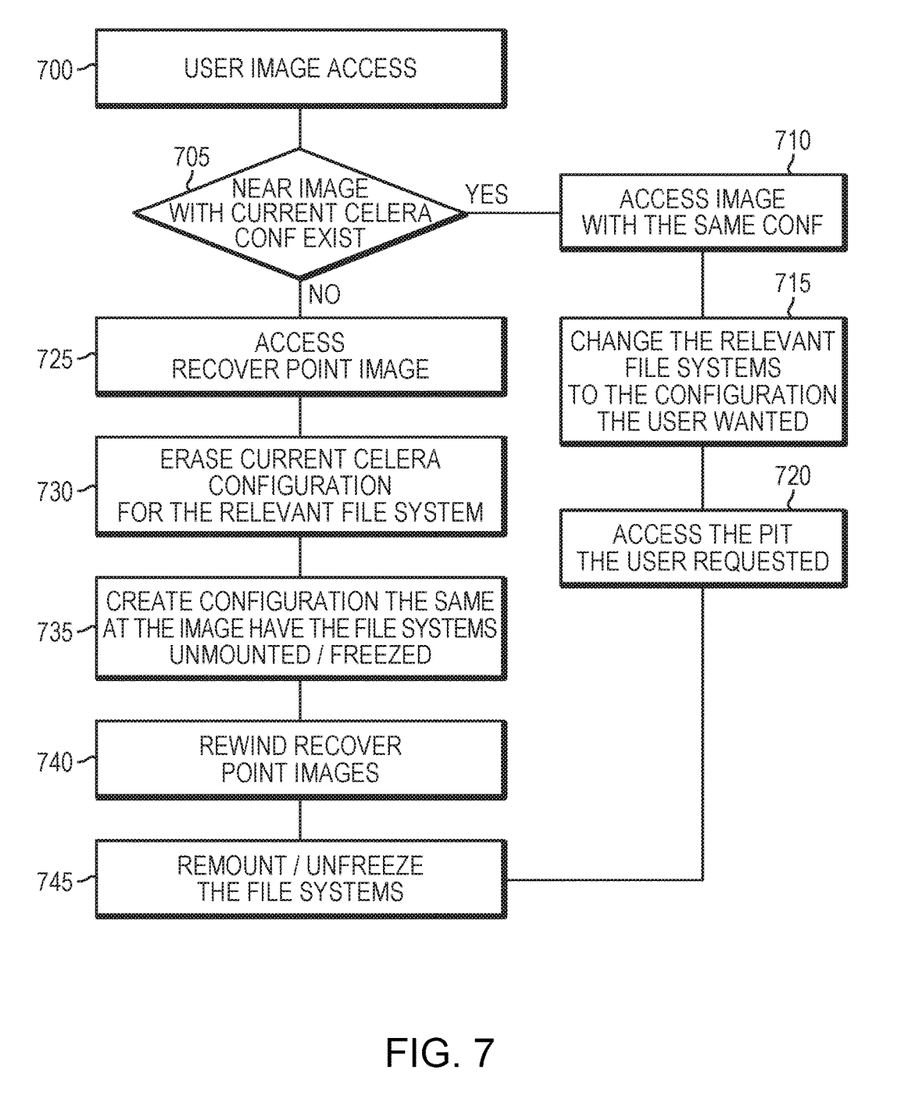
FIG. 7 is an embodiment of methods for requesting a user image that can be applied to the system of FIG. 1.

In an alternative embodiment, it may be desired to access a point in time which corresponds to a replicated image with a different system configuration than the current system configuration. In this embodiment, there are two different cases, when there is a replicated image with the same configuration or when no such image exists. For example, refer to the embodiment as illustrated in FIG. 7. The user may seek to access an image 700. It may be determined whether a near image with current data system configuration exists 705.

In the case where there is a near image in the appliance, the near image may be mounted and the appliance may point to this image. The relevant file systems configuration may be changed. Then the file system may be remounted and the image the user requested accessed. If the configuration exists, the system may allow access to the image with the configuration the same as the current configuration 710. Then the relevant portion of the file system may be changed to the configuration the user wants. 715. Then, the Point in time the user requested may be accessed 720. The file system may then be remounted and thawed 745.

If a similar configuration does not exist, then a replicated image may be accessed 725. The current configuration for the replicated file system may be erased 730. A configuration may be created that matches the image associated with the requested point in time and the file system may be frozen or un-mounted 735. The replicated image may then be rewound to the appropriate point in time 740. The file system may be unfrozen and remounted 745.

The methods and apparatus of this invention may take the form, at least partially, of program logic or code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine may be transformed into a special purpose digital machine.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method comprising:
   receiving a copy of an Input/Output (IO), from a splitter on a production site, at an appliance; wherein the splitter captures IOs written to a set of volumes on a data storage system on the production site, wherein a file system of a set of file systems is stored on a meta volume of the set of volumes; wherein the meta volume is a concatenation of two or more other volumes of the set of volumes; wherein the file system of the set of file systems is being replicated to a replication site; wherein each volume of the set of volumes contains slices of a stripe of the meta volume, the splitter dividing the slices between the volumes of the set of volumes and wherein each of the slices are recursively further divided into slices contained on the meta volume; wherein the file system uses automatic volume management in which the file system is extended using a new slice from a storage pool when a predetermined threshold is exceeded;

determining, at the appliance, whether the IO is directed to the file system being replicated by:
 translating the target location of the IO to a logical address; and
 determining, based on the logical address and a mapping, if a portion of the determined volume stores the file system being replicated wherein the mapping denotes where each of the respective file systems of the files systems are stored on each respective volume of the volumes;

based on a positive determination that the IO is directed to the replicated file system, sending the IO directed to the replicated file system to a replication site; and acknowledging the receipt of the IO.

2. The method of claim 1 further comprising:
pausing the replicated file system;
recording a bookmark corresponding to the image of the file system; and
resuming the replicated file system.

3. The method of claim 2 further comprising: setting a timer; and recording a new bookmark based on the timer.

4. The method of claim 1 further comprising:
using the IO to determine that the configuration of the replicated file system has changed;
wherein the change in configuration includes changing the size of the file system;
recording a bookmark corresponding to the new configuration; and
updating the configuration of the replication device to correspond to the new configuration of the replicated file system.

5. The method of claim 4 wherein updating the configuration includes reading the structure of the set of volumes and set of files systems on the data storage system to determine where what portion of each file system of the set of files systems is stored on each portion of each volume of the set of volumes.

6. The method of claim 1 further comprising: periodically checking for configuration changes of the file system.

7. The method of claim 6 further comprising:
determining that the current configuration of the file system does not match the configuration of the replicated file system;
recording a new configuration corresponding to the current configuration of the file system; and
updating the configuration of the replication device to correspond to the new configuration of the replicated file system.

8. The method of claim 1 wherein the appliance creates the mapping by reading the structure of the set of volumes and set of files systems on the data storage system to determine where what portion of each file system of the set of files systems is stored on each portion of each volume of the set of volumes.

9. A system comprising:
a computer having a memory;
computer-executable logic operating in memory, wherein the computer-executable logic is configured for execution of the following:
receiving a copy of an Input/Output (IO), from a splitter on a production site, at an appliance; wherein the splitter captures IOs written to a set of volumes on a data storage system on the production site, wherein a file system of a set of file systems is stored on a meta volume of the set of volumes; wherein the meta volume is a concatenation of two or more other volumes of the set of volumes; wherein the file system of the set of file systems is being replicated to a replication site; wherein each volume of the set of volumes contains slices of a stripe of the meta volume, the splitter dividing the slices between the volumes of the set of volumes and wherein each of the slices are recursively further divided into slices contained on the meta volume; wherein the file system uses automatic volume management in which the file system is extended using a new slice from a storage pool when a predetermined threshold is exceeded;

determining, at the appliance, whether the IO is directed to the file system being replicated by:
 translating the target location of the IO to a logical address;
 determining, based on the logical address, to which volume of the set of volumes the IO is directed; and
 determining, based on the logical address and a mapping, if a portion of the determined volume stores the file system being replicated; wherein the mapping denotes where each of the respective file systems of the file systems are stored on each respective volume of the volumes;

based on a positive determination that the IO is directed to the replicated file system, sending the IO directed to the replicated file system to a replication site; and acknowledging the receipt of the TO.

10. The system of claim 9 wherein the logic is further configured for: pausing the replicated file system; recording a bookmark corresponding to the image of the file system; and resuming the replicated file system.

11. The system of claim 9 wherein the logic is further configured for: setting a timer; and recording a new bookmark based on the timer.

12. The system of claim 9 wherein the logic is further configured for: using the IO to determine that the configuration of the replicated file system has changed; wherein the change in configuration includes changing the size of the file system; recording a bookmark corresponding to the new configuration; and updating the configuration of the replication device to correspond to the new configuration of the replicated file system.

13. The system of claim 9 wherein the logic is further configured for: periodically checking the current configuration of the file system.

14. The system of claim 9 wherein the logic is further configured for: determining that the current configuration of the file system does not match the configuration of the replicated file system; recording a new configuration corresponding to the current configuration of the file system; and updating the configuration of the replication device to correspond to the new configuration of the replicated file system.

15. A program product comprising:
a non-transitory computer-readable storage medium encoded with computer-executable program code enabling:

receiving a copy of an Input/Output (IO), from a splitter on a production site, at an appliance; wherein the splitter captures IOs written to a set of volumes on a data storage system on the production site, wherein a file system of a set of file systems is stored on a meta volume of the set of volumes; wherein the meta volume is a concatenation of two or more other volumes of the set of volumes; wherein the file system of the set of file systems is being replicated to a replication site; wherein each volume of the set of volumes contains slices of a stripe of the meta volume, the splitter dividing the slices between the volumes of the set of volumes and wherein each of the slices are recursively further divided into slices contained on the meta volume; wherein the file system uses automatic volume management in which the file system is extended using a new slice from a storage pool when a predetermined threshold is exceeded;

determining, at the appliance, whether the IO is directed to the file system being replicated by:
  translating the target location of the IO to a logical address;
  determining, based on the logical address, to which volume of the set of volumes the IO is directed; and
  determining, based on the logical address and a mapping, if a portion of the determined volume stores the file system being replicated; wherein the mapping denotes where each of the respective file systems of the files systems are stored on each respective volume of the volumes;
based on a positive determination that the IO is directed to the replicated file system, sending the IO directed to the replicated file system to a replication site; and
acknowledging the receipt of the TO.

16. The program product of claim 15 the computer-executable program code further comprising:
  pausing the replicated file system;
  recording a bookmark corresponding to the image of the file system; and
  resuming the replicated file system.

17. The program product of claim 16 the computer-executable program code further comprising setting a timer; and recording a new bookmark based on the timer.

18. The program product of claim 15 the computer-executable program code further comprising:
  using the IO to determine that the configuration of the replicated file system has changed;
  wherein the change in configuration is enabled to include changing the size of the file system;
  recording a bookmark corresponding to the new configuration; and
  updating the configuration of the replication device to correspond to the new configuration of the replicated file system.

19. The program product of claim 15 the computer-executable program code further comprising periodically checking for configuration changes of the file system.

20. The program product of claim 19 the computer-executable program code further enabling:
  determining that the current configuration of the file system does not match the configuration of the replicated file system;
  recording a new configuration corresponding to the current configuration of the file system; and
  updating the configuration of the replication device to correspond to the new configuration of the replicated file system.

* * * * *